J. R. LOMAS.
Pedestals for Stools and Tables.

No. 140,054.  Patented June 17, 1873.

Witnesses.
J. H. Shumway
A. J. Tibbits

John R. Lomas
Inventor
By Atty.
John P. Earle

UNITED STATES PATENT OFFICE.

JOHN R. LOMAS, OF NEW HAVEN, CONNECTICUT, ASSIGNOR TO BERNARD SHONINGER, OF SAME PLACE.

IMPROVEMENT IN PEDESTALS FOR STOOLS AND TABLES.

Specification forming part of Letters Patent No. 140,054, dated June 17, 1873; application filed May 23, 1873.

*To all whom it may concern:*

Be it known that I, JOHN R. LOMAS, of New Haven, in the county of New Haven and State of Connecticut, have invented a new Improvement in Pedestal for Stools and Tables; and I do hereby declare the following, when taken in connection with the accompanying drawings and the letters of reference marked thereon, to be a full, clear, and exact description of the same, and which said drawings constitute part of this specification, and represent in—

Figure 1:
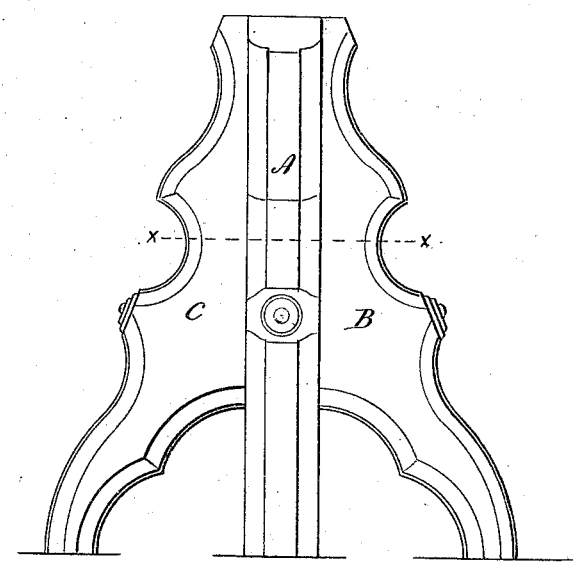
Figure 2:
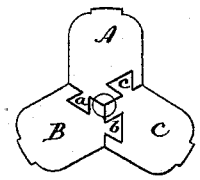

Figure 1 a side view, and in Fig. 2 a transverse section on line $x\ x$.

This invention relates to an improvement in the construction of legs or supports for that class of stools, tables, &c., which rest upon a center or pedestal, the said center terminating in three or more feet or legs at the bottom.

These pedestals have usually been constructed in parts glued together, depending entirely upon the glue for security; and as it is impossible to bring the wood into a condition that it will not shrink, it frequently occurs that the parts separate, rendering them useless until repaired. This form of construction makes a great inconvenience in packing for transportation.

The object of this invention is to simplify the construction and secure the parts together so that they are not liable to accidental separation, but may be readily separated for transportation; and the invention consists in constructing the several parts which form the pedestal, so as to interlock with each other at their meeting-points, such interlocking preventing the accidental disengagement, but allowing the parts to be separated when desired.

In this representation the pedestal is formed from three parts, A B C. These parts meet at the center, and upon the surface of each a vertical rib, $a\ b\ c$, is formed, and a corresponding vertical groove upon each of the other parts, so that the rib $a$ will pass into the corresponding groove on the part B, and the rib $b$ on the part B into the corresponding groove on the part C, and so on, each rib of one part setting into the groove of the next. These parts are set together by entering the top of one into the bottom of the other, and forcing it vertically until they come into their proper position, as seen in Fig. 1.

For piano-stools, and for all purposes where a screw or bolt is desirable, the central portion may be cut away, as denoted in broken lines, Fig. 2, without in any way interfering with the connection. A plate may be placed on the upper or lower end, or other means employed to prevent the vertical movement of the parts independent of each other.

Thus constructed, the parts may be separated and packed so as to be brought into a compact form for transportation, and the fitting may be readily done by machinery, so that the parts for a number of pedestals may be made without fitting together, and any of the parts taken to form a set, will fit each other.

I claim as my invention—

A pedestal for stools, tables, and like articles formed from several parts united each to the other, by means of ribs on one part and a corresponding groove on the other part, substantially as set forth.

J. R. LOMAS.

Witnesses:
J. H. SHUMWAY,
A. J. TIBBITS.